June 24, 1958 — N. E. PICCIONE — 2,840,674
ELECTRICAL BUS DISCONNECT
Filed Aug. 12, 1955
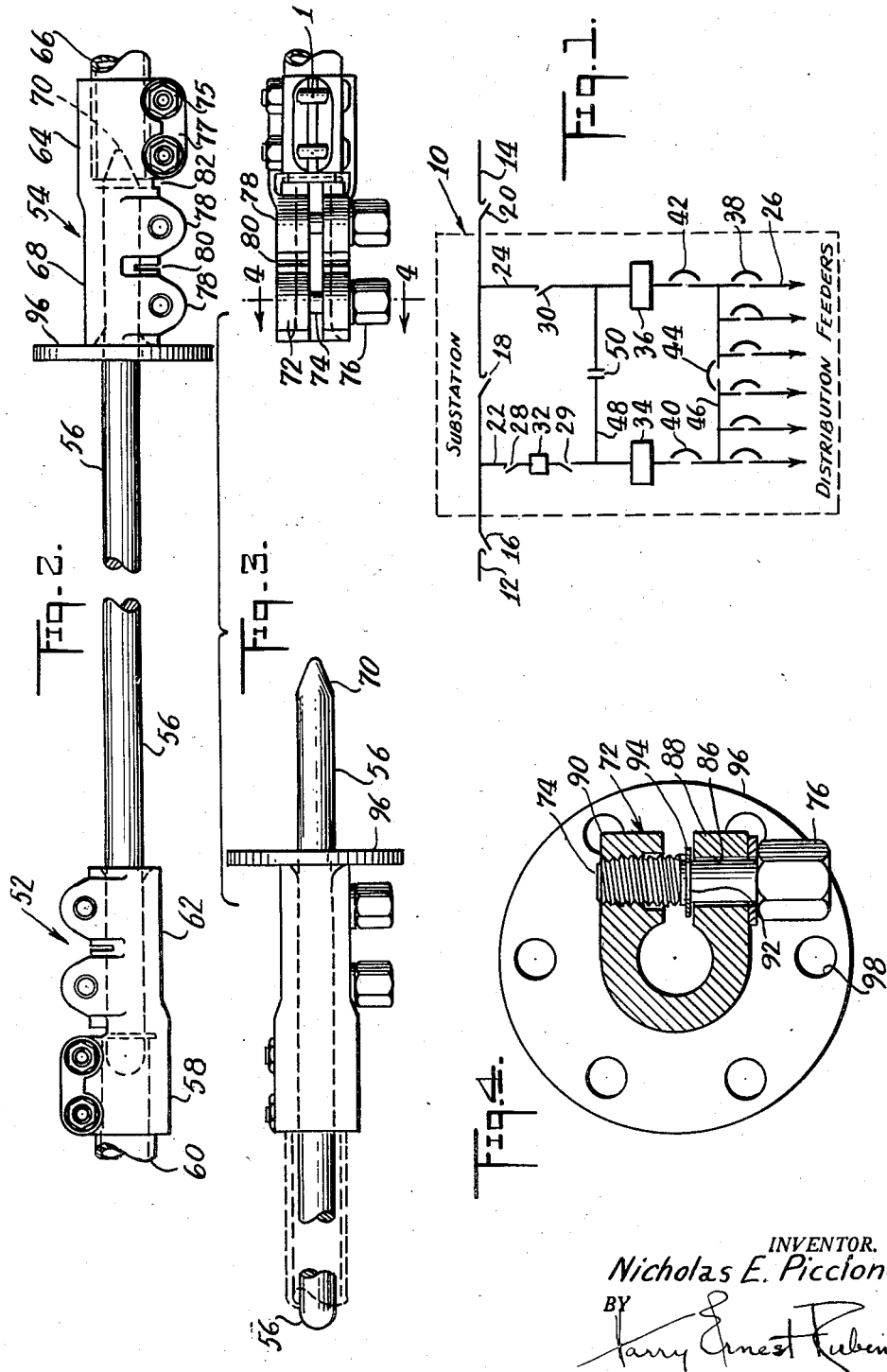
INVENTOR.
Nicholas E. Piccione
BY
ATTORNEY

United States Patent Office 2,840,674
Patented June 24, 1958

2,840,674

ELECTRICAL BUS DISCONNECT

Nicholas E. Piccione, Huntington, N. Y., assignor to Burndy Engineering Co. Inc., a corporation of New York Application August 12, 1955, Serial No. 528,048

3 Claims. (Cl. 200—163)

My invention relates to a bus disconnect used to sectionalize and isolate bus sections in the event of equipment failure in substations. The conventional sectionalizing equipment employs blade type switches that require considerable space, frequent maintenance, structural steel mountings and additional foundations for steel structural members. Thus the material and installation costs of the conventional blade type disconnects are high.

Modern designers are eliminating disconnects in bus sections connecting two transformer banks in parallel. In order to perform adequate equipment maintenance at the substation, the substation is de-energized by transferring the load to another substation. This is not always possible because of inadequate network ties and capacities of supporting stations required to absorb the load of the station to be de-energized.

Accordingly, the principal object of my invention is to provide a new type of disconnect that may be used to economically sectionalize and isolate bus sections in the event of equipment failures in substations, that will permit the operation of the substation at reduced capacity while damaged equipment is being restored, that will permit substation design and layout in confined spaces at a considerable saving in structural steel and foundations, that will eliminate periodic maintenance normally required on gang operated switches, that is simple in design, requires no special mountings, is easily installed, while its function is equal to or better than the conventional blade type disconnect.

I accomplish these and other objects and obtain my new results as will be apparent from the device described in the following specification, particularly pointed out in the claims, and illustrated in the accompanying drawings, in which:

Fig. 1 is a schematic layout of a typical substation wherein the disconnects of my invention may be employed.

Fig. 2 is a top plan view of my disconnect in contact position.

Fig. 3 is a side elevation of the same in retracted or open position.

Fig. 4 is an enlarged sectional view taken in plane 4—4 of Fig. 3.

In Fig. 1 of the drawing, I have schematically illustrated, for example, a substation employing the disconnects of my invention. The substation 10 is shown tied in to the 34.5 or 69 kv. transmission lines 12 and 14 provided with conventional 600 ampere gang operated, air break switches indicated as 16, 18 and 20. On each side of the intermediate switch 18 positioned in the substation, the tap circuits 22 and 24 are made, leading to the distribution feeders 26.

In both of the parallel tap lines, gang operated switch disconnects, such as 28, 29 and 30 are inserted; and in line 22 an oil circuit breaker 32 is positioned between switch disconnects 28 and 29. The transformers 34 and 36 are thereafter positioned, one in each line and magnetic air blast circuit breakers are provided, one in each of the distribution feeders, such as 38, one in each of the top lines 40 and 42, respectively, and one, 44, intermediate the main distribution feeder bus 46.

In the shunt line 48, it is customary to provide a pair of switch type disconnects to sectionalize and isolate either of the transformers. As has been stated, modern designers have eliminated disconnects entirely in the shunt line, in the interest of economy, involving transferring the load entirely to another substation while damaged equipment is being restored.

I have found that disconnects of my design may be provided in the shunt line in place of the switch disconnects hitherto used, with substantial savings in overall costs.

I accomplish this with the disconnect 50 illustrated in Figs. 2 and 3, and comprising generally two socket members 52 and 54, to which a sliding copper contactor rod 56 is mechanically and electrically connected. The metal parts are preferably made of highly conductive metal. One of the socket members, 52, is employed for accommodating and supporting the contactor rod in retracted position. It is divided into two separate gripping portions, one 58 for gripping a hollow tubular bus 60, and the other portion 62 for gripping the contactor rod. The remaining socket member 54 also contains two separate gripping portions, one 64 for gripping a hollow tubular bus 66, and another portion 68 for gripping the contacting end 70 of the rod 56. The clamping sections of the socket members are C-shaped, the two ends of the C being tightened to each other by bolts. For example, the tubular bus gripping section 68, like section 58, is provided with apertured extensions 72, through which bolts 74 extend, which are tightened at their heads 76. The tubular bus 66 extends through gripping section 64 and is secured thereto by bolts 75 locking extensions 77. The internal diameter of the tubular bus 60 is sufficiently larger to accommodate easily the body of contactor rod 56 when in retracted position in portion 58.

In socket 68, which is similar to socket 62, the clamping sections are each divided into extending ear portions 78, separated from each other by a slot 80. The ear portions are similarly separated from apertured extensions 77 by a slot 82. It is thus possible to independently tighten the ear sections from each other and from the apertured extensions, which provides better surface contact with less likelihood of one of the bolts being loosened when the others are tightened.

A section of the apertured ear sections is shown in Fig. 4. Each section contains a special bolt 74 which freely passes through aperture 86 in one ear 88 of each pair 72, and threadedly engages the remaining ear 90. The bolt is undercut, as at 92, to accommodate retaining ring 94. The retaining ring forces ear 86 away from ear 90 when the bolt is unthreaded, thus opening the ears when it is desired to move the contactor in its socket, as for example, when moving from the contact to retracted position.

The contactor 56 is circular in cross-section with rounded ends to facilitate uniform gripping by the clamping sections and to permit easy entrance and movement in the tubular bus and socket section, respectively.

The rod is preferably provided with suitable means, such as the circular flat disk 96 which may be brazed or otherwise secured to the rod, to permit engagement by "hot" line equipment, such as a "hot stick" for opening and closing the circuit. Holes 98 may be formed peripherally about the disk to facilitate hooking by the hot stick and for permitting leverage to be applied to the contactor to break any tendency for the contactor to seize within the tube or clamps. All current passing junctions are preferably silver coated to provide improved contact conductivity.

The disconnect of my design, being relatively light in weight, is supported by the two tubular bus or steel structural supports present in installation of conventional switching equipment. After installation, no maintenance is necessary. In the event a failure occurs in one of the transformers, for example 36, it may be isolated by opening switch 30, circuit breaker 42 and tubular bus disconnect 50.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

I claim:

1. An electrical disconnect comprising a pair of spaced apart clamping elements, means for locking each clamping element into intimate contact with a supporting bus, a sliding contactor extending from one spaced clamping element to the other, and separate means for locking each clamping element about an end of the contactor to permit the sliding contactor to be locked into intimate contact with the clamping elements to form a closed disconnect.

2. The disconnect of claim 1, wherein the sliding contactor is provided with an apertured disk positioned apart from both ends thereof for engagement with a suitable instrument for moving the contactor.

3. The combination of the disconnect of claim 1 with a tubular supporting bus and wherein the contactor is circular in cross-section, and having a diameter sufficiently smaller than the tubular bus to be accommodated therein.

References Cited in the file of this patent

UNITED STATES PATENTS

| | | |
|---|---|---|
| 1,697,769 | Koppitz | Jan. 1, 1929 |
| 2,032,301 | Newman | Feb. 25, 1936 |
| 2,123,631 | Koehler | July 12, 1938 |